US012626222B2

(12) United States Patent
Bai et al.

(10) Patent No.: US 12,626,222 B2
(45) Date of Patent: May 12, 2026

(54) METHOD AND APPARATUS FOR PROCESSING LOGISTICS ORDER TASK, ELECTRONIC DEVICE, AND COMPUTER MEDIUM

(71) Applicant: Beijing Jingdong Zhenshi Information Technology Co., Ltd., Beijing (CN)

(72) Inventors: Xiufeng Bai, Beijing (CN); Ying Zhu, Beijing (CN)

(73) Assignee: Beijing Jingdong Zhenshi Information Technology Co., Ltd., Beijing (CN)

( * ) Notice: Subject to any disclaimer, the term of this patent is extended or adjusted under 35 U.S.C. 154(b) by 179 days.

(21) Appl. No.: 18/557,611

(22) PCT Filed: Apr. 13, 2022

(86) PCT No.: PCT/CN2022/086682
§ 371 (c)(1),
(2) Date: Oct. 27, 2023

(87) PCT Pub. No.: WO2022/228132
PCT Pub. Date: Nov. 3, 2022

(65) Prior Publication Data
US 2024/0211876 A1     Jun. 27, 2024

(30) Foreign Application Priority Data

Apr. 29, 2021     (CN) .......................... 202110471375.6

(51) Int. Cl.
*G06Q 10/087*     (2023.01)
*G06Q 10/0631*     (2023.01)

(52) U.S. Cl.
CPC ....... *G06Q 10/087* (2013.01); *G06Q 10/0631* (2013.01)

(58) Field of Classification Search
CPC ............ G06Q 10/087; G06Q 10/0631; G06Q 10/0832; G06Q 10/083
See application file for complete search history.

(56) References Cited

U.S. PATENT DOCUMENTS 8,335,585 B2     12/2012  Hansl et al.
11,182,743 B2 *  11/2021  Li .......................... G06Q 30/06
(Continued)

FOREIGN PATENT DOCUMENTS

CA          3149178 A1      2/2021
CN          102633077 A     8/2012
(Continued)

OTHER PUBLICATIONS

Notice of Allowance dated Jul. 10, 2024 for Chinese Application No. 202110489084.X.
(Continued)

*Primary Examiner* — Dylan C White
(74) *Attorney, Agent, or Firm* — Qinghong Xu

(57) ABSTRACT

Provided is a method and an apparatus for processing a logistics order task, an electronic device, and a computer medium. The method for processing the logistics order task includes: detecting a quantity of an item on a shelf, the item being associated with a positioning task having been received; determining a time for receiving the positioning task; determining, based on the quantity of the item and/or the time for receiving the positioning task, whether the shelf meets a scheduling condition; and transporting the shelf that meets the scheduling condition to a sorting workstation directed by the positioning task.

14 Claims, 6 Drawing Sheets

(56) References Cited

U.S. PATENT DOCUMENTS

| | | | |
|---|---|---|---|
| 2003/0004775 A1 | 1/2003 | Lin et al. | |
| 2006/0054692 A1 | 3/2006 | Dickey | |
| 2014/0107833 A1 | 4/2014 | Segawa et al. | |
| 2016/0019633 A1 | 1/2016 | Waddington et al. | |
| 2017/0011336 A1* | 1/2017 | Stevens | B65G 1/1373 |
| 2017/0091704 A1* | 3/2017 | Wolf | G06Q 10/08 |
| 2020/0302391 A1* | 9/2020 | Li | G06Q 10/0875 |
| 2021/0110334 A1* | 4/2021 | Singh | G06Q 10/087 |
| 2024/0242165 A1* | 7/2024 | Takeda | B65G 1/137 |

FOREIGN PATENT DOCUMENTS

| | | | | |
|---|---|---|---|---|
| CN | 106956883 A | | 7/2017 | |
| CN | 106980949 A | | 7/2017 | |
| CN | 106997195 A | | 8/2017 | |
| CN | 107844929 A | | 3/2018 | |
| CN | 108694636 A | | 10/2018 | |
| CN | 108846609 A | * | 11/2018 | G06Q 10/087 |
| CN | 108961016 A | | 12/2018 | |
| CN | 109117999 A | | 1/2019 | |
| CN | 109409454 A | | 3/2019 | |
| CN | 109658027 A | | 4/2019 | |
| CN | 110033061 A | | 7/2019 | |
| CN | 110182527 A | * | 8/2019 | B65G 1/137 |
| CN | 110223011 A | | 9/2019 | |
| CN | 111369182 A | | 7/2020 | |
| CN | 111415122 A | | 7/2020 | |
| CN | 111507651 A | | 8/2020 | |
| CN | 111507664 A | | 8/2020 | |
| CN | 211403479 U | | 9/2020 | |
| CN | 111738654 A | | 10/2020 | |
| CN | 111738656 A | | 10/2020 | |
| CN | 111815214 A | | 10/2020 | |
| CN | 111822366 A | | 10/2020 | |
| CN | 112389916 A | | 2/2021 | |
| CN | 112446657 A | | 3/2021 | |
| CN | 112561416 A | | 3/2021 | |
| CN | 112712294 A | | 4/2021 | |
| CN | 113240362 A | | 8/2021 | |
| CN | 113240363 A | | 8/2021 | |
| CN | 113269487 A | | 8/2021 | |
| JP | H11208825 A | | 8/1999 | |
| JP | 3260526 B2 | | 2/2002 | |
| JP | 2005206281 A | | 8/2005 | |
| JP | 2021039667 A | | 3/2021 | |
| KR | 20200113463 A | | 10/2020 | |
| WO | 2018064937 A1 | | 4/2018 | |
| WO | 2019154445 A2 | | 8/2019 | |
| WO | WO-2023084732 A1 | * | 5/2023 | B65G 1/137 |

OTHER PUBLICATIONS

Notice of Allowance dated Apr. 30, 2024 for Chinese Application No. 202110489118.5.

Sander van der Putten et al., Automating Supply Chain Negotiations using Autonomous Agents a Case Study in Transportation logistics, AAMAS '06: Proceedings of the fifth international joint conference on Autonomous agents and multiagent systems, published on May 8, 2006.

Yanyan Wang et al., Research on picking order batching policy of a distribution center, Journal of Shandong University (Engineering Science), vol. 40, No. 2, published on Apr. 16, 2010.

Extended European Search Report dated Oct. 1, 2024 of European Application No. 22794603.5.

Wang Qiang, Wang Dan, Xiang Yichen, "Design and Implementation of WMS Warehouse Management System", "Computer Engineering& Software", 2018, 39(1): 153-158.

Wang Yunbo, "Design and Application of Intelligent Logistics Warehousing Management System Based on Internet of Things", "Techniques of Automation & Applications", Jun. 21, 2019.

Ma Lin, Shen Minde, etc, "Development and application of automatic sorting technology of drugs", "School of Mechanical Engineering, Shandong Polytechnic University , Jinan 250353 , China", Apr. 8, 2011.

Wang Ping, "Philatelic network warehouse distribution integrated management mode to promote the transformation and upgrading of warehousing logistics in the province", Aug. 15, 2018.

1st Office Action dated Jul. 28, 2023 of Chinese Application No. 202110489084X.

1st Office Action dated Jul. 9, 2023 of Chinese Application No. 2021104713756.

1st Office Action dated Jul. 7, 2023 of Chinese Application No. 2021104891185.

1st Office Action dated Jul. 29, 2023 of Chinese Application No. 2021104891325.

1st Office Action dated Jul. 1, 2023 of Chinese Application No. 2021105142653.

International Search Report dated Jun. 29, 2022 of International Application No. PCT/CN2022/086682.

International Search Report dated Jul. 7, 2022 of International Application No. PCT/CN2022/086684.

International Search Report dated Jul. 25, 2022 of International Application No. PCT/CN2022/090057.

2nd Office Action dated May 7, 2025 of Japanese Application No. 2023-553648.

Notice of Final Rejection dated May 28, 2025 of Korean Application No. 10-2023-7030139.

Notice of Allowance dated Aug. 5, 2025 of Japanese Application No. 2023-553648.

* cited by examiner

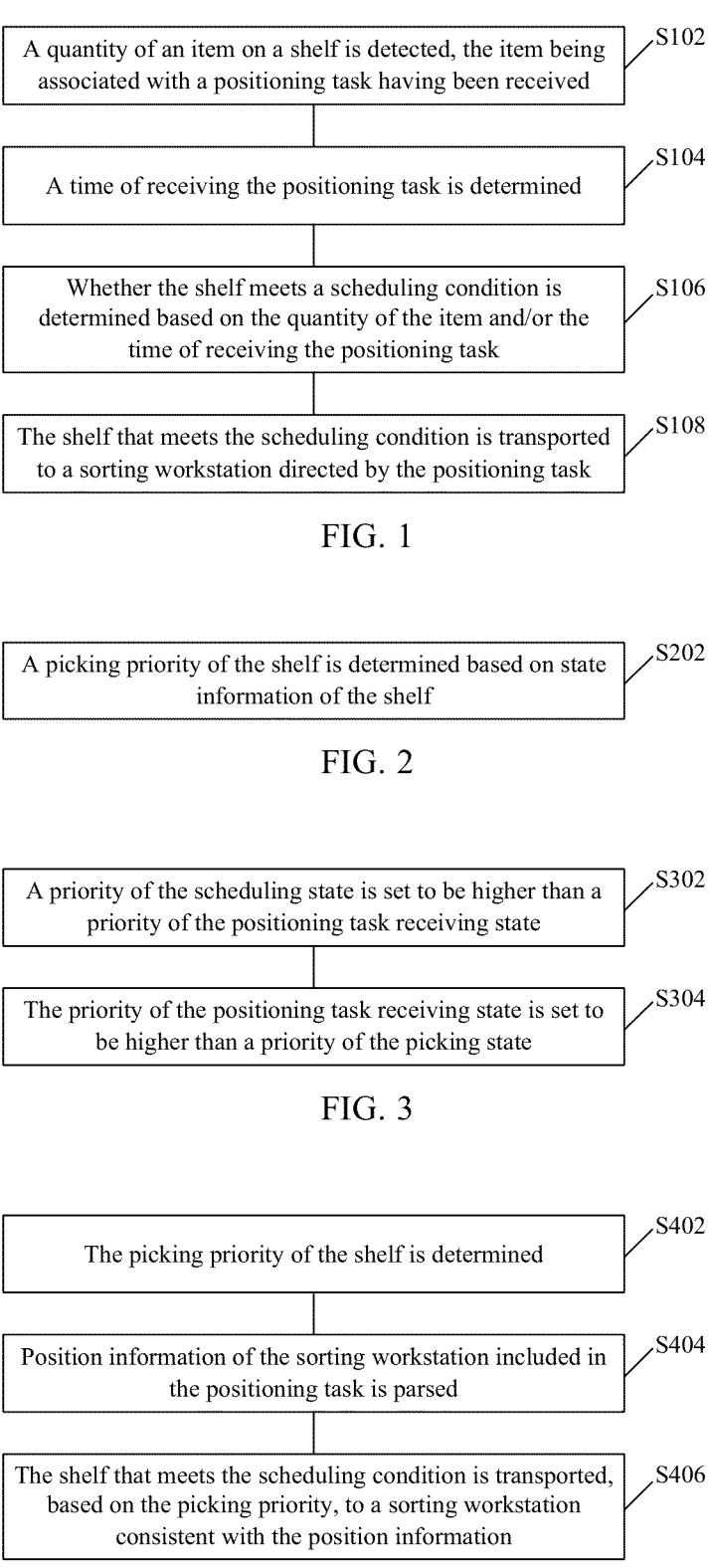

A quantity of an item on a shelf is detected, the item being associated with a positioning task having been received                    S102

A time of receiving the positioning task is determined                    S104

Whether the shelf meets a scheduling condition is determined based on the quantity of the item and/or the time of receiving the positioning task                    S106

The shelf that meets the scheduling condition is transported to a sorting workstation directed by the positioning task                    S108

FIG. 1

A picking priority of the shelf is determined based on state information of the shelf                    S202

FIG. 2

A priority of the scheduling state is set to be higher than a priority of the positioning task receiving state                    S302

The priority of the positioning task receiving state is set to be higher than a priority of the picking state                    S304

FIG. 3

The picking priority of the shelf is determined                    S402

Position information of the sorting workstation included in the positioning task is parsed                    S404

The shelf that meets the scheduling condition is transported, based on the picking priority, to a sorting workstation consistent with the position information                    S406

FIG. 4

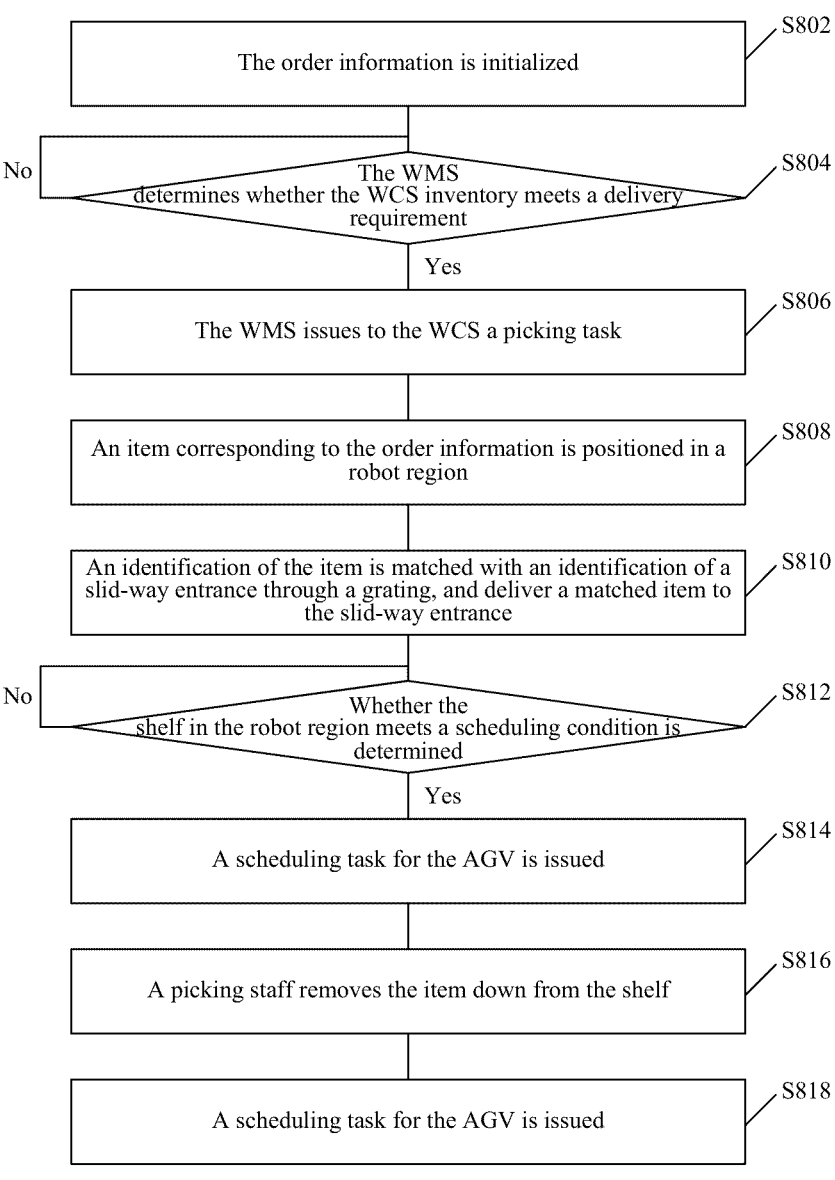

The order information is initialized ⟋S802

No — The WMS determines whether the WCS inventory meets a delivery requirement ⟋S804

Yes

The WMS issues to the WCS a picking task ⟋S806

An item corresponding to the order information is positioned in a robot region ⟋S808

An identification of the item is matched with an identification of a slid-way entrance through a grating, and deliver a matched item to the slid-way entrance ⟋S810

No — Whether the shelf in the robot region meets a scheduling condition is determined ⟋S812

Yes

A scheduling task for the AGV is issued ⟋S814

A picking staff removes the item down from the shelf ⟋S816

A scheduling task for the AGV is issued ⟋S818

FIG. 8

| Detection module 1102 | Determination module 1104 | Judgment module 1106 | Transportation module 1108 |
|---|---|---|---|

Apparatus 1100 for processing the logistics order task

METHOD AND APPARATUS FOR PROCESSING LOGISTICS ORDER TASK, ELECTRONIC DEVICE, AND COMPUTER MEDIUM

CROSS REFERENCE TO RELATED APPLICATIONS

The application is a U.S. national phase application of International Application No. PCT/CN2022/086682, filed on Apr. 13, 2022, which claims priority to Chinese Patent Application No. 202110471375.6, filed on Apr. 29, 2021 and entitled "METHOD AND APPARATUS FOR PROCESSING LOGISTICS ORDER TASK, ELECTRONIC DEVICE, AND COMPUTER MEDIUM", the entire contents of which are incorporated herein by reference for all purposes.

TECHNICAL FIELD

The present disclosure relates to the field of logistics technology, in particular to a method and an apparatus for processing a logistics order task, an electronic device, and a computer medium.

BACKGROUND

At present, the flow-based picking is a kind of picking mode which takes a commodity as the smallest unit, breaking the limitations of a task order. The picking staffs can pick goods according to a channel order and a walking path, which can greatly improve picking density and efficiency.

It should be noted that the information disclosed in this section above is only used to enhance the understanding of the background of the present disclosure, and therefore may include information that does not constitute prior art already known to those ordinary skilled in the art.

SUMMARY

According to a first aspect of the present disclosure, a method for processing a logistics order task is provided, and includes: detecting a quantity of an item on a shelf, wherein the item is associated with a positioning task having been received: determining a time of receiving the positioning task: determining, based on the quantity of the item and/or the time of receiving the positioning task, whether the shelf meets a scheduling condition: and transporting the shelf that meets the scheduling condition to a sorting workstation directed by the positioning task.

According to a second aspect of the present disclosure, an apparatus for processing a logistics order task is provided, and includes: a detection module configured to detect a quantity of an item on a shelf, wherein the item is associated with a positioning task having been received: a determination module configured to determine a time of receiving the positioning task: a judgment module configured to determine, based on the quantity of the item and/or the time of receiving the positioning task, whether the shelf meets a scheduling condition: and a transportation module configured to transport the shelf that meets the scheduling condition to a sorting workstation directed by the positioning task.

According to a third aspect of the present disclosure, an electronic device is provided, and includes: a memory: and a processor coupled to the memory, the processor being configured to implement, based on instructions stored in the memory, the method for processing the logistics order task as described in any of the above aspects.

According to a fourth aspect of the present disclosure, a computer-readable storage medium is provided, on which a program is stored, and when the program is executed by a processor, the method for processing the logistics order task as described in any of the above aspects is caused to be implemented.

It should be understood that the general description above and the detailed description in the following are only illustrative and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

FIG. 1 is a flowchart of a method for processing a logistics order task according to some embodiments of the present disclosure:

FIG. 2 is a flowchart of a method for processing a logistics order task according to some embodiments of the present disclosure;

FIG. 3 is a flowchart of a method for processing a logistics order task according to some embodiments of the present disclosure:

FIG. 4 is a flowchart of a method for processing a logistics order task according to some embodiments of the present disclosure:

FIG. 8 is a flowchart of a method for processing a logistics order task according to some embodiments of the present disclosure:

DETAILED DESCRIPTION

Figure 5:
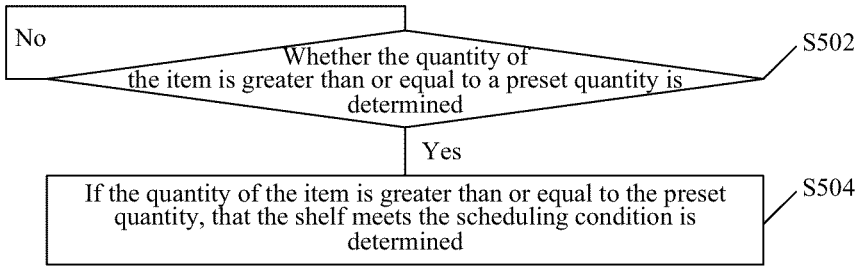
FIG. 5 is a flowchart of a method for processing a logistics order task according to some embodiments of the present disclosure.

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The described features, structures or characteristics may be combined in any suitable manner in one or more embodiments. In the following description, many specific details are provided in order to give a thorough understanding of the embodiments of the present disclosure. However, those skilled in the art will recognize that technical solutions of the present disclosure can be practiced without one or more of particular details described, or other methods, components, devices, steps, etc. may be employed. In other cases, well-known solutions have not been shown or described in detail so as to avoid obscuring aspects of the present disclosure.

In addition, the drawings are merely schematic illustrations of the present disclosure and are not necessarily drawn to scale. The same reference numerals in the figures denote the same or similar parts, and thus their repeated description will be omitted. Some of the block diagrams shown in the drawings are functional entities and do not necessarily correspond to physically or logically separate entities. These functional entities may be implemented in software, or in one or more hardware modules or integrated circuits, or in different networks and/or processor devices and/or microcontroller devices.

In the related technology, in the flow-based picking mode, an ideal scenario is where the picking staffs pick goods at intervals according to a certain distance, ensuring a balanced picking task volume and avoiding overlapping and alternating picking paths among multiple picking staffs.

In a real situation, however, due to differences in the behavior of each picking staff, for example, a picking speed, a throwing-line frequency, and unexpected interruptions in picking, etc., two main issues are resulted:

(1) in the case of alternating picking, the number of single picking tasks at a storage location is greatly reduced, resulting in an uneven amount of tasks received by the picking staff and a decrease in the overall picking density.

(2) the picking staffs are distributed unevenly within the channel, which resulted in a backlog of tasks in some channels for too long, affecting the efficiency of consolidation of the backend order and the delivery efficiency.

Embodiments of the present disclosure will be described in detail in the following with reference to the drawings.

FIG. 1 is a flowchart of a method for processing a logistics order task according to some embodiments of the present disclosure.

Referring to FIG. 1, the method for processing the logistics order task can include following steps.

In step S102, a quantity of an item on a shelf is detected, the item being associated with a positioning task having been received.

In some embodiments of the present disclosure, a type and the quantity of the item, as well as a position (or a number) of the shelf where the item is located, required for an order to be delivered are determined based on order information. The positioning task is determined based on the position of the shelf where the item is located. Receiving a positioning task is to associate the item in the order information with the shelf in terms of the position.

In some embodiments of the present disclosure, the quantity of the item associated with the positioning task having been received can also be understood as a total quantity of items having been positioned on the shelf. A threshold of the quantity of the item can be configured, so as to ensure a minimum picking density for picking on a single shelf by the picking staff.

In step S104, a time of receiving the positioning task is determined.

In some embodiments of the present disclosure, the timing is started after the positioning task is received, to determine the time, or the time is determined based on a timestamp carried by the positioning task.

In some embodiments of the present disclosure, the time of receiving the positioning task includes a time of an earliest positioning task positioned on the shelf, and an interval time threshold is set for the time of receiving the positioning task.

In some embodiments of the present disclosure, if the interval time threshold is set as 30 minutes, when a system determines that the interval time from the time of the earliest positioning task positioned on the shelf to the current time is more than 30 minutes, a scheduling task will be issued to the shelf, even if a determination condition for the quantity of item is not met. As a result, the occurrence of some commodities associated with fewer positioning tasks and corresponding shelves not being picked for a long time can be reduced, which is conducive to improving the efficiency of the full collection of the items included in a corresponding order.

In step S106, whether the shelf meets a scheduling condition is determined based on the quantity of the item and/or the time of receiving the positioning task.

In some embodiments of the present disclosure, the scheduling condition means that one or more shelves are transported to a sorting workstation. Whether the shelf meets the scheduling condition can be determined alone based on the quantity of the item or the time of receiving the positioning task, or determined comprehensively based on the quantity of the item and the time of receiving the positioning task, so as to balance a relationship between the delivery efficiency and a recheck backlog quantity.

In step S108, the shelf that meets the scheduling condition is transported to a sorting workstation directed by the positioning task.

In some embodiments of the present disclosure, an item-to-staff picking mode is provided, by determining whether the shelf meets the scheduling condition based on the quantity of the item and/or the time of receiving the positioning task, and transporting the shelf that meets the scheduling condition to the sorting workstation directed by the positioning task, which improves the picking density and the delivery efficiency.

In some embodiments of the present disclosure, after the shelf is transported to the sorting workstation directed by the positioning task, prompt information, such as storage positions for all pending picking tasks and the quantity of the item to be picked on the current shelf, is provided. If the items on the shelf can meet multiple order information, different prompt information can be provided to prompt that items belong to different orders.

In some embodiments of the present disclosure, the shelf is transported through a trolley AGV (Automated Guided Vehicle). The AGV is equipped with an electromagnetic or optical automatic navigation device, and can travel along a specified navigation path. The AGV is a transport vehicle with safety protection and various transfer functions. In the industrial application, the AGV is a transport vehicle without a driver, which uses a rechargeable battery as its power source. A travel path and behavior of the AGV can be generally controlled through a computer, or the travel path can be established by using an electromagnetic path-following system. The electromagnetic path-following system is attached to the floor, an unmanned transport vehicle moves and behaves based on the information brought by the electromagnetic path-following system.

In some embodiments of the present disclosure, as shown in FIG. 2, the method for processing the logistics order task further includes following steps.

In step S202, a picking priority of the shelf is determined based on state information of the shelf, the state information of the shelf including information about a scheduling state, a positioning task receiving state, and a picking state.

In some embodiments of the present disclosure, the positioning task receiving state is a state where the shelf is in a picking storage region, and the WCS can position a newly placed order to the shelf.

In some embodiments of the present disclosure, the WCS (Warehouse Control System) can be divided into three levels. The top level is WMS, which is responsible for processing the warehousing business logic. The bottom level is specific logistics equipment, such as a narrow aisle stacker crane, an AGV system, etc. The WCS is located in a middle layer between the WMS and the logistics equipment, responsible for coordinating and scheduling various logistics equipment at the bottom level, so that the logistics equipment at the bottom level can implement the business process of the warehousing system. The process is completely executed according to the process preset through the program.

In some embodiments of the present disclosure, the scheduling state refers to a state where whether the shelf meets the scheduling condition is determined. The WCS issues to the AGV the scheduling task, and the AGV transports the shelf to a destination sorting workstation. During the above process, the WCS can also position new orders onto the shelf.

In some embodiments of the present disclosure, the picking state refers to a state where the picking staff scans a shelf code until picking on the shelf is completed or before the picking staff terminates the picking operation. During the above process, the WCS can also position new orders onto the shelf, but the orders will not be picked up by the sorting workstation in this picking.

In some embodiments of the present disclosure, as shown in FIG. 3, determining, based on state information of the shelf, the picking priority of the shelf includes following steps.

In step S302, a priority of the scheduling state is determined to be higher than a priority of the positioning task receiving state.

In some embodiments of the present disclosure, the picking density of items on the shelf in the scheduling is improved by determining the priority of the scheduling state to be higher than the priority of the positioning task receiving state.

In step S304, the priority of the positioning task receiving state is determined to be higher than a priority of the picking state.

In some embodiments of the present disclosure, the shelf in the picking state can receive positioning tasks, but do not determine whether the scheduling condition is met, so as to reduce the probability of errors, repeated picking, missed picking, etc., in the data exchange process.

In some embodiments of the present disclosure, as shown in FIG. 4, transporting the shelf that meets the scheduling condition to the sorting workstation directed by the positioning task includes following steps.

In step S402, the picking priority of the shelf is determined.

In step S404, position information of the sorting workstation included in the positioning task is obtained.

In some embodiments of the present disclosure, the AGV transports the shelf to the corresponding sorting workstation based on the position information, so as to perform centralized picking processing on items corresponding to the order information on the shelf, thereby improving the picking density and the picking efficiency.

In step S406, the shelf that meets the scheduling condition is transported, based on the picking priority, to a sorting workstation consistent with the position information.

In some embodiments of the present disclosure, a sequence and the efficiency of transporting the shelf can be optimized, as well as improving the reliability and accuracy of picking and delivery, by transporting, based on the picking priority, the shelf that meets the scheduling condition to a sorting workstation consistent with the position information.

In some embodiments of the present disclosure, as shown in FIG. 5, determining whether the shelf meets the scheduling condition based on the quantity of the item and/or the time of receiving the positioning task includes following steps.

In step S502, whether the quantity of the item is greater than or equal to a preset quantity is determined.

In step S504, if the quantity of the item is greater than or equal to the preset quantity, that the shelf meets the scheduling condition is determined.

In some embodiments of the present disclosure, the preset quantity can be adjusted based on a recheck backlog quantity, a recheck speed, and a delivery speed. If a quantity is determined to be greater than or equal to the preset quantity, it is determined that the shelf meets the scheduling condition. As a result, the density and efficiency of picking on the shelf is improved.

Figure 6:
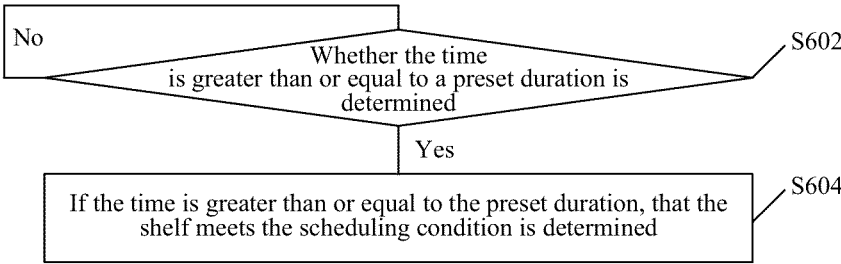
FIG. 6 is a flowchart of a method for processing a logistics order task according to some embodiments of the present disclosure.

In some embodiments of the present disclosure, as shown in FIG. 6, determining whether the shelf meets the scheduling condition based on the quantity of the item and/or the time of receiving the positioning task further includes following steps.

In step S602, whether the time is greater than or equal to a preset duration is determined.

In step S604, if the time is greater than or equal to the preset duration, that the shelf meets the scheduling condition is determined.

In some embodiments of the present disclosure, the preset duration can be adjusted based on the recheck backlog quantity, the recheck speed, and the delivery speed. If the time is determined to be greater than or equal to the preset duration, it is determined that the shelf meets the scheduling condition. As a result, the density and efficiency of picking on the shelf is improved.

Figure 7:
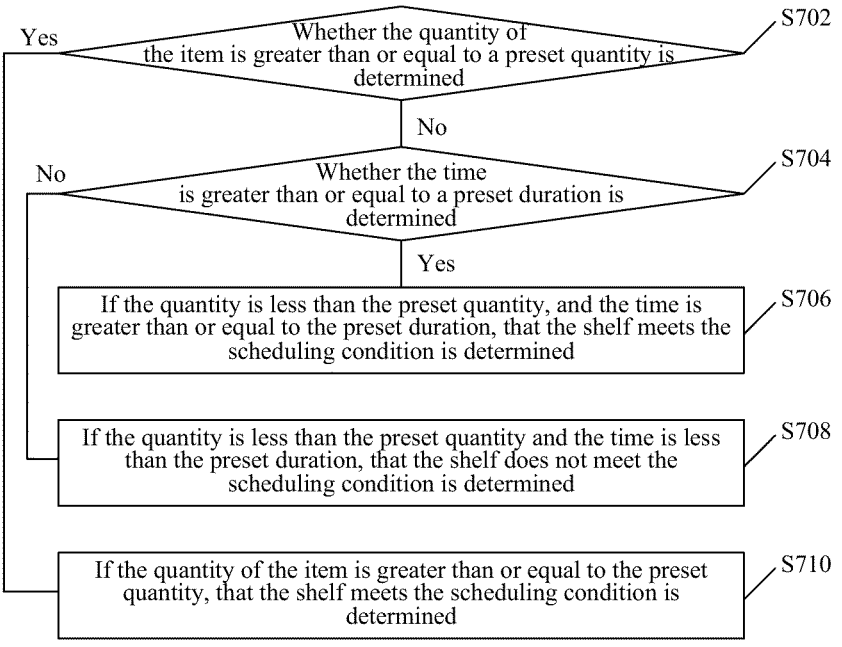
FIG. 7 is a flowchart of a method for processing a logistics order task according to some embodiments of the present disclosure.

In some embodiments of the present disclosure, as shown in FIG. 7, determining whether the shelf meets the scheduling condition based on the quantity of the item and/or the time of receiving the positioning task further includes following steps.

In step S702, whether the quantity of the item is greater than or equal to a preset quantity is determined. If the quantity of the item is greater than or equal to the preset quantity, step S710 is executed. If the quantity of the item is not greater than or equal to the preset quantity, step S704 is executed.

In step S704, whether the time is greater than or equal to a preset duration is determined. If the time is greater than or equal to the preset duration, step S706 is executed. If the time is not greater than or equal to the preset duration, step S708 is executed.

In step S706, if the quantity is less than the preset quantity, and the time is greater than or equal to the preset duration, that the shelf meets the scheduling condition is determined.

In some embodiments of the present disclosure, if the quantity is determined to be less than the preset quantity and the time is determined to be greater than or equal to the preset duration, it is determined that the shelf meets the scheduling, so as to avoid the occurrence of some commodities associated with fewer positioning tasks and corresponding shelves not being picked for a long time, which affects the full collection of the items included in the corresponding order.

In step S708, if the quantity is less than the preset quantity and the time is less than the preset duration, that the shelf does not meet the scheduling condition is determined.

In step S710, if the quantity is greater than or equal to the preset quantity, that the shelf meets the scheduling condition is determined.

In some embodiments of the present disclosure, if the quantity is determined to be less than the preset quantity and the time is determined to be less than the preset duration, it is determined that the shelf does not meet the scheduling condition, so as to reduce the number of times the shelf is transported is reduced, while ensuring the efficiency of the full collection of the items included in a corresponding order.

As shown in FIG. 8, in some embodiments of the present disclosure, the method for processing the logistics order task includes following steps.

In step S802, the order information is initialized.

In step S804, the WMS determines whether the WCS inventory meets a delivery requirement. If the WCS inventory meets the delivery requirement, step S806 is executed. If the WCS inventory does not meet the delivery requirement, step S802 is executed.

In step S806, the WMS issues to the WCS a picking task.

In step S808, an item corresponding to the order information is positioned in a robot region.

In step S810, an identification of the item is matched with an identification of a slid-way entrance through a grating, and deliver a matched item to the slid-way entrance.

In step S812, whether the shelf in the robot region meets a scheduling condition is determined. If the shelf in the robot region meets the scheduling condition, step S814 is executed. If the shelf in the robot region does not meet the scheduling condition, step S812 is executed.

In step S814, a scheduling task for the AGV is issued.

In step S816, a picking staff removes the item down from the shelf.

In step S818, a scheduling task for the AGV is issued.

In some embodiments, if it is determined that the shelf meets the scheduling condition, the WCS issues to the AGV the scheduling task. When selecting the destination sorting workstation for shelf, the shelf is allocated based on a real-time task backlog quantity (number of items to be picked) of each online sorting workstation, and the following scheduling strategy is followed:

Strategy (1): in an initial allocation, calculation is performed based on the real-time task backlog quantity of each sorting workstation at the time of allocation, and the shelf is allocated to a workstation with the fewest task backlog quantity.

Strategy (2): if the picking staff pauses the sorting workstation from receiving orders, a new scheduling task will be issued to the shelves waiting in the queue within the sorting workstation, and the shelves will be allocated according to the allocation principle in Strategy (1).

In some embodiments, WMS (Warehouse Management System) 904 has functions such as warehouse-in service, warehouse-out service, stock transfer, inventory transfer, and virtual warehouse management. The WMS is a comprehensive management system that integrates batch management, material correspondence, inventory counting, quality inspection management, virtual warehouse management, and real-time inventory management. The WMS can effectively control and track the entire logistics and cost management process of warehouse business, realize or improve the warehouse information management of enterprises. This system can independently perform inventory operations and can also be used in conjunction with documents and vouchers of other systems, providing enterprises with more complete logistics management processes and financial management information.

Figure 9:
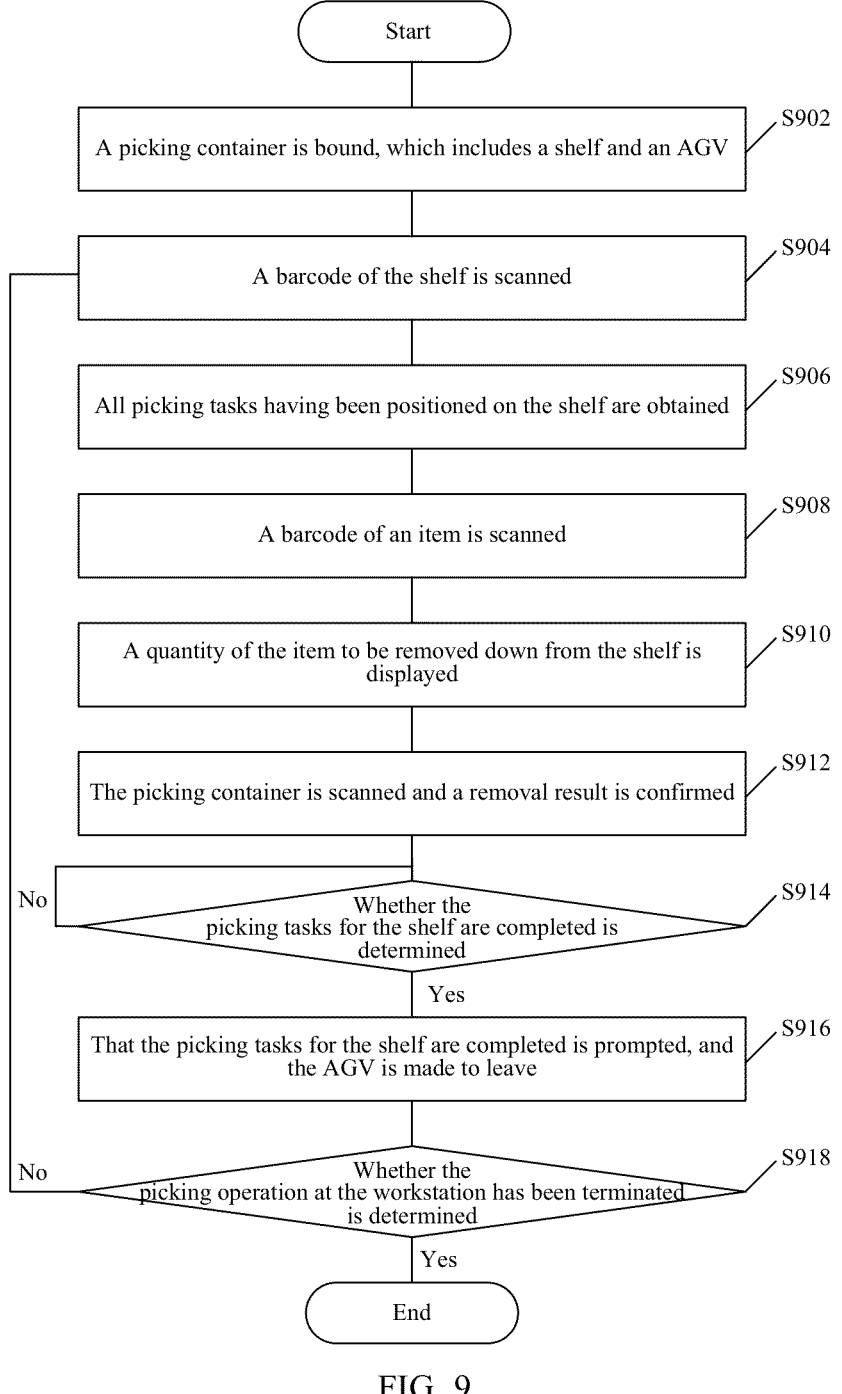
FIG. 9 is a flowchart of a method for processing a logistics order task according to some embodiments of the present disclosure.

As shown in FIG. 9, in some embodiments of the present disclosure, the method for processing the logistics order task includes following steps.

In step S902, a picking container is bound, which includes a shelf and an AGV.

In step S904, a barcode of the shelf is scanned.

In step S906, all picking tasks having been positioned on the shelf are obtained.

In step S908, a barcode of an item is scanned.

In step S910, a quantity of the item to be removed down from the shelf is displayed.

In step S912, the picking container is scanned and a removal result is confirmed.

In step S914, whether the picking tasks for the shelf are completed is determined; if the picking tasks for the shelf are completed, step S916 is executed: if the picking tasks for the shelf are not completed, step S914 is executed.

In step S916, that the picking tasks for the shelf are completed is prompted, and the AGV is made to leave.

In step S918, whether the picking operation at the workstation has been terminated is determined: if the picking at the workstation has been terminated, the method is ended: if the picking at the workstation has not been terminated, step S904 is executed.

Figures 10, 11:
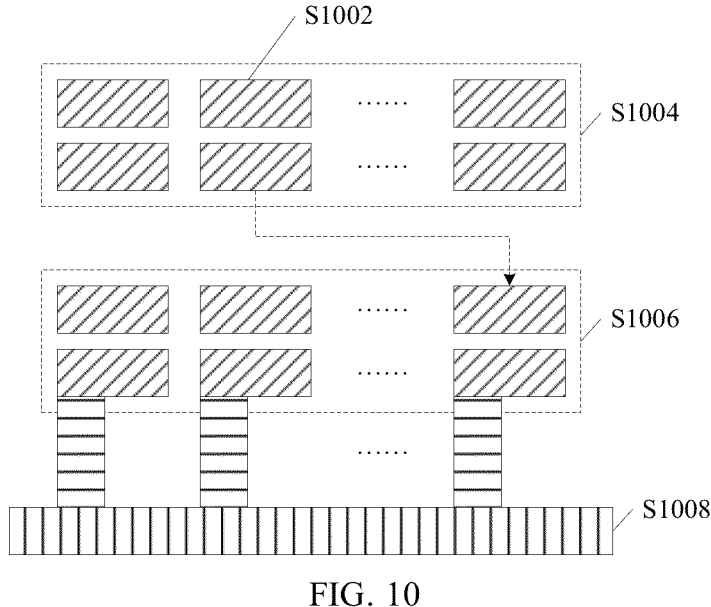
FIG. 10 is a schematic diagram of a scheme for processing a logistics order task according to some embodiments of the present disclosure.
FIG. 11 is a block diagram of an apparatus for processing a logistics order task according to some embodiments of the present disclosure.

As shown in FIG. 10, each sorting workstation is assigned a picking staff, and the picking operation process is as follows.

(1) Firstly, a picking container is bound to a picking workbench.

(2) A barcode of shelf 1002 is scanned, and the current shelf 1002 is bound to the picking workbench. The picking staff receives all pending picking tasks on the shelf 1002 until the binding operation is completed. A system interface prompts storage positions of all items associated with picking tasks on the current shelf 1002.

(3) The AGV transports the shelf 1002 from storage region 1004 to picking region 1006. The picking staff picks up the item from a corresponding storage position, scans the barcode of the item, and the system prompts a quantity of the item to be removed down from the shelf.

(4) The picking staff counts the quantity of the item. If the quantity of the item on the shelf 1002 meets the quantity demand, the item(s) will be placed in the picking container, the picking container code will be scanned, and the picking result is submitted. The inventory will be deducted accordingly. If the quantity of the item on the shelf 1002 does not meet the quantity demand, the discrepancy reporting process will be followed.

(5) The system determines whether there are any pending picking tasks bound to the picking workbench on the shelf 1002. If there are still pending picking tasks bound to the picking workbench on the shelf 1002, above steps (3) to (4) are repeated. If there are no pending picking tasks bound to the picking workbench on the shelf 1002, the system prompts the picking staff that the picking tasks for the current shelf 1002 have been completed and the AGV is about to leave. After confirming that the picking is completed, the shelf 1002 is unbound from the picking workbench.

(6) The WCS issues to the AGV a scheduling task based on the quantity of newly added positioning tasks on the current shelf 1002. If the scheduling condition described in (3) is met, the destination sorting workstation will be allocated for the AGV according to the scheduling strategy described in (4). If the scheduling condition is not met, a scheduling command will be issued to transport the shelf 1002 to the storage region 1004 to wait for being positioned.

(7) The picking staff can continue scanning a next shelf 1002 and continue picking until the container is full of items, and a full container operation can be achieved. After the container is full, the conveyor line transports the picking container to a next operating point, for example, importing the picking container into the distribution station or the recheck station 1008.

(8) During the picking process, the picking staff can operate the "pause receiving picking tasks", and then remove the shelf 1002 that has already been bound to the sorting workstation. Scheduling tasks will be reissued to the remaining shelf 1002.

Embodiments of the present disclosure also provide an apparatus for processing a logistics order task corresponding to the above method embodiments. The apparatus for processing the logistics order task can be used to implement the above method embodiments.

FIG. 11 is a block diagram of an apparatus for processing a logistics order task according to some embodiments of the present disclosure.

Referring to FIG. 11, the apparatus 1100 for processing the logistics order task can include a detection module 1102, a determination module 1104, a judgment module 1106, and a transportation module 1108.

The detection module 1102 is configured to detect a quantity of an item on a shelf, the item being associated with a positioning task having been received.

The determination module 1104 is configured to determine a time of receiving the positioning task.

The judgment module 1106 is configured to determine whether the shelf meets a scheduling condition based on the quantity of the item and/or the time of receiving the positioning task.

The transportation module 1108 is configured to transport the shelf that meets the scheduling condition to a sorting workstation directed by the positioning task.

In some embodiments of the present disclosure, the determination module 1104 is further configured to determine, based on state information of the shelf, a picking priority of the shelf, the state information of the shelf including information about a scheduling state, a positioning task receiving state, and a picking state.

In some embodiments of the present disclosure, the determination module 1104 is further configured to a priority of the scheduling state to be higher than a priority of the positioning task receiving state; and/or set the priority of the positioning task receiving state to be higher than a priority of the picking state.

In some embodiments of the present disclosure, the transportation module 1108 is further configured to determine a picking priority of the shelf: obtain position information of the sorting workstation included in the positioning task: and transport, based on the picking priority, the shelf that meets the scheduling condition to the sorting workstation consistent with the position information.

In some embodiments of the present disclosure, the judgment module 1106 is further configured to determine whether the quantity of the item is greater than or equal to a preset quantity: and determine that the shelf meets the scheduling condition if the quantity of the item is greater than or equal to the preset quantity.

In some embodiments of the present disclosure, the judgment module 1106 is further configured to determine whether the time is greater than or equal to a preset duration: and determine that the shelf meets the scheduling condition if the time is greater than or equal to the preset duration.

In some embodiments of the present disclosure, the judgment module 1106 is further configured to determine whether the quantity of the item is greater than or equal to a preset quantity: determine whether the time is greater than or equal to a preset duration; determine that the shelf meets the scheduling condition if the quantity is less than the preset quantity and the time is greater than or equal to the preset duration: and determine that the shelf does not meet the scheduling condition if the quantity is less than the preset quantity and the time is less than the preset duration.

Various functions of apparatus 1100 have been described in detail in corresponding method embodiments, which will not be repeated herein.

It should be noted that although several modules or units of the apparatus provided for action execution are mentioned in above descriptions in detail, such division of modules is not mandatory. In fact, according to embodiments disclosed in the present disclosure, the features and functions of two or more modules or units described above can be embodied in one module or unit. On the contrary, the features and functions of one module or unit described above can be further divided into multiple modules or units for implementation.

In some embodiments of the present disclosure, an electronic device capable of implementing the above methods is also provided.

Those skilled in the art can understand that various aspects of the present disclosure can be implemented as systems, methods, or program products. Therefore, various aspects of the present disclosure can be specifically implemented in the following forms: the complete hardware implementation, the complete software implementation (including firmware, microcode, etc.), or a combination of hardware and software implementations, which can be collectively referred to as "circuit", "module", or "system".

An electronic device 1200 according to embodiments of the present disclosure will be described below with reference to FIG. 12. The electronic device 1200 shown in FIG. 12 is only an example and should not impose any limitations on the functionality and scope of use of the embodiments of the present disclosure.

Figure 12:
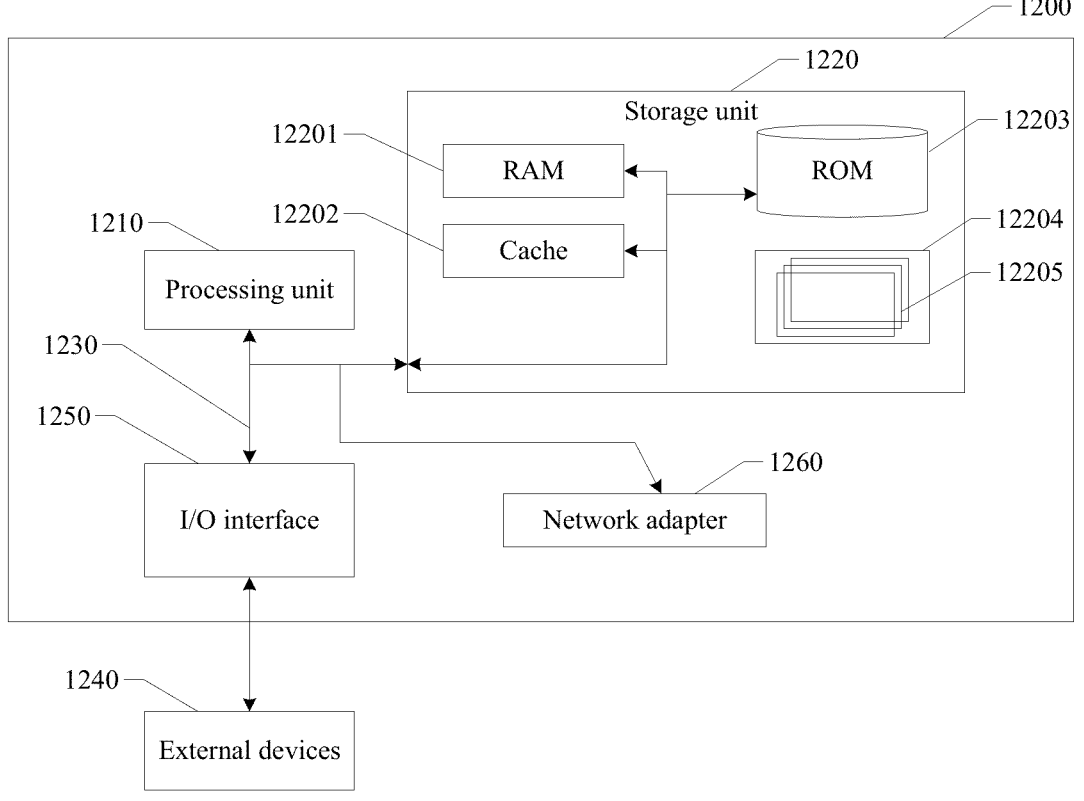
FIG. 12 is a block diagram of an electronic device according to some embodiments of the present disclosure.

As shown in FIG. 12, the electronic device 1200 is represented in the form of a universal computing device. The components of electronic device 1200 can include but are not limited to at least one processing unit 1210, at least one storage unit 1220, and a bus 1230 connecting different system components (including storage unit 1220 and processing unit 1210).

In some embodiments, the storage unit stores program codes, which can be executed by the processing unit 1210, causing the processing unit 1210 to execute steps described in the "exemplary methods" according to various exemplary embodiments of the present disclosure. For example, the processing unit 1210 can implement the methods as shown in embodiments of the present disclosure.

The storage unit 1220 can include a readable medium in the form of a volatile storage unit, such as a random access storage unit (RAM) 12201 and/or a cache storage unit 12202, and may further include a read-only storage unit (ROM) 12203.

The storage unit 1220 can further include a program/utility tool 12204 with a (at least one) set of program modules 12205, such as but not limited to an operating system, one or more application programs, other program modules, and program data, each or some combination of which may include an implementation of a network environment.

The bus 1230 can represent one or more types of bus structures, including storage unit buses or storage unit controllers, peripheral buses, graphics acceleration ports, processing units, or local area buses using any of various bus structures.

The electronic device 1200 can also communicate with one or more external devices 1240 (such as a keyboard, a pointing device, a Bluetooth device, etc.), and can also communicate with one or more devices that enable users to interact with electronic device 1200, and/or with any device that enables electronic device 1200 to communicate with one or more other computing devices (such as a router, a modem, etc.). The communication can be carried out through an input/output (I/O) interface 1250. Moreover, electronic device 1200 can also communicate with one or more networks (such as a local area network (LAN), a wide area network (WAN), and/or a public network, such as the Internet) through a network adapter 1260. As shown in the figure, the network adapter 1260 communicates with other modules of electronic device 1200 through the bus 1230. It should be understood that although not shown in the figure, other hardware and/or software modules can be used in conjunction with electronic device 1200, including but not limited to microcodes, device drivers, redundant processing units, external disk drive arrays, RAID systems, tape drives, and data backup storage systems.

According to descriptions of above method embodiments, it is easy for those skilled in the art to understand that the exemplary method embodiments described herein can be implemented through software or through combination of software and necessary hardware. Therefore, the technical solutions according to embodiments of the present disclosure can be embodied in the form of a software product, which can be stored on a non-volatile storage medium (such as CD-ROM, USB drive, mobile hard drive, etc.) or on a network, including several instructions to enable a computing device (such as a personal computer, a server, a terminal device, or a network device, etc.) to execute the methods according to embodiments of the present disclosure.

In some embodiments of the present disclosure, a computer-readable storage medium is also provided, on which a program product capable of implementing the methods described in the present disclosure is stored. In some embodiments, various aspects of the present disclosure can also be implemented in the form of a program product, which includes program codes used to cause the terminal device to perform steps described in "exemplary methods"

according to various exemplary embodiments of the present disclosure when the program product is running on the terminal device.

The program product for implementing above method according to embodiments of the present disclosure can be a portable compact disk read only memory (CD-ROM) including program codes, and can be run on a terminal device, such as running on a personal computer. However, the program product of the present disclosure is not limited thereto. In the present disclosure, a readable storage medium may be any tangible medium that contains or stores a program, and the program can be used by or in conjunction with an instruction execution system, apparatus, or device.

The program product may be any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include, electrical connections with one or more wires, portable disks, hard disks, random access memory (RAM), read only memory (ROM), erasable programmable read only memory (EPROM or flash), optical fiber, portable compact disk read only memory (CD-ROM), optical storage devices, magnetic storage devices, or any suitable combination of the above.

A computer readable signal medium may include a propagated data signal in a baseband or as part of a carrier wave with readable program codes embodied thereon. Such propagated data signals may take a variety of forms, including but not limited to electromagnetic signals, optical signals, or any suitable combination of the above. A readable signal medium may also be any readable medium other than a readable storage medium that can transmit, propagate, or transport the program used by or in connection with the instruction execution system, apparatus, or device.

The program codes embodied on the readable medium may be transmitted using any suitable medium, including but not limited to wireless, wireline, optical fiber cable, RF, etc., or any suitable combination of the above.

The program codes for carrying out operations of the present disclosure may be written in any combination of one or more programming languages, including object-oriented programming languages, such as Java, C++, etc., as well as conventional procedural programming languages, such as "C" language or similar programming languages. The program codes may be executed entirely on a user's computing device, partly on the user's device, as a stand-alone software package, partly on the user's computing device and partly on a remote computing device, or entirely on the remote computing device or a server. Where the remote computing device is involved, the remote computing device may be connected to the user's computing device over any kind of network, including a local area network (LAN) or a wide area network (WAN), or may be connected to an external computing device (e.g., connected via the Internet with the help of an Internet Service Provider).

In addition, the above drawings are only a schematic explanation of processes included in the methods according to exemplary embodiments disclosed in the present disclosure, and are not for the purpose of limitation. It is easy to understand that the processes shown in above figures do not indicate or limit an order of these processes. In addition, it is also easy to understand that these processes can be executed, for example, through multiple modules synchronously or asynchronously.

After considering and practicing the content disclosed in the present disclosure, those skilled in the art will easily come up with other embodiments of the present disclosure. The present disclosure is intended to cover any variations, uses, or adaptations of the present disclosure, which follow the general principles of the present disclosure and include common knowledge or commonly used technical means in the art that are not disclosed in the present disclosure. The specification and embodiments are only considered exemplary, and a true scope and spirit of the present disclosure are indicated by claims.

INDUSTRIAL APPLICABILITY

According to embodiments of the present disclosure, whether the shelf meets the scheduling condition is determined based on the quantity of the item and/or the time of receiving the positioning task, and the shelf that meets the scheduling condition is transported to the sorting workstation directed by the positioning task, which provides an item-to-staff picking mode, improves the picking density and the delivery efficiency, and reduces the recheck backlog quantity and the manual picking pressure.

What is claimed is:

1. A method for processing a logistics order task, comprising:

detecting a quantity of an item on a shelf in a storage region, wherein the item is associated with a positioning task having been received;

determining a time of receiving the positioning task;

determining, based on the quantity of the item and the time of receiving the positioning task, whether the shelf meets a scheduling condition, comprising:

determining whether the quantity of the item is greater than or equal to a preset quantity;

determining that the shelf meets the scheduling condition if the quantity of the item is greater than or equal to the preset quantity;

determining whether the time is greater than or equal to a preset duration if the quantity of the item is less than the preset quantity; and determining that the shelf meets the scheduling condition if the time is greater than or equal to the preset duration; and transporting, using an automated guided vehicle (AGV), the shelf that meets the scheduling condition from the storage region to a sorting workstation in a picking region directed by the positioning task.

2. The method for processing the logistics order task according to claim 1, further comprising:

determining, based on state information of the shelf, a picking priority of the shelf, wherein the state information of the shelf comprises information about a scheduling state, a positioning task receiving state, and a picking state.

3. The method for processing the logistics order task according to claim 2, wherein determining, based on state information of the shelf, the picking priority of the shelf comprises at least one of:

determining a priority of the scheduling state to be higher than a priority of the positioning task receiving state; or determining the priority of the positioning task receiving state to be higher than a priority of the picking state.

4. The method for processing the logistics order task according to claim 2, further comprising:

issuing the positioning task to the shelf in any of the scheduling state, the positioning task receiving state, and the picking state.

5. The method for processing the logistics order task according to claim 1, wherein transporting, using the AGV, the shelf that meets the scheduling condition from the storage region to the sorting workstation in the picking region directed by the positioning task comprises:

determining a picking priority of the shelf;

obtaining position information of the sorting workstation comprised in the positioning task; and transporting, based on the picking priority, the shelf that meets the scheduling condition from the storage region to the sorting workstation in the picking region consistent with the position information using the AGV.

6. The method for processing the logistics order task according to claim 1, wherein determining the time of receiving the positioning task comprises:

determining the time by starting timing after the positioning task is received, or determining the time based on a timestamp carried by the positioning task.

7. The method for processing the logistics order task according to claim 1, further comprising:

performing calculation based on a real-time task backlog quantity of each sorting workstation; and allocating the shelf that meets the scheduling condition to a workstation with the fewest task backlog quantity.

8. An electronic device, comprising:

a memory; and a processor coupled to the memory, wherein the processor is configured to:

detect a quantity of an item on a shelf in a storage region, wherein the item is associated with a positioning task having been received;

determine a time of receiving the positioning task;

determine, based on the quantity of the item and the time of receiving the positioning task, whether the shelf meets a scheduling condition, comprising:

determining whether the quantity of the item is greater than or equal to a preset quantity;

determining that the shelf meets the scheduling condition if the quantity of the item is greater than or equal to the preset quantity;

determining whether the time is greater than or equal to a preset duration if the quantity of the item is less than the preset quantity; and determining that the shelf meets the scheduling condition if the time is greater than or equal to the preset duration; and transport, using an automated guided vehicle (AGV), the shelf that meets the scheduling condition from the storage region to a sorting workstation in a picking region directed by the positioning task.

9. The electronic device according to claim 8, wherein the processor is further configured to:

determine, based on state information of the shelf, a picking priority of the shelf, wherein the state information of the shelf comprises information about a scheduling state, a positioning task receiving state, and a picking state.

10. The electronic device according to claim 9, wherein the processor is further configured to at least one of:

determine a priority of the scheduling state to be higher than a priority of the positioning task receiving state; or determine the priority of the positioning task receiving state to be higher than a priority of the picking state.

11. The electronic device according to claim 9, wherein the processor is further configured to:

issue the positioning task to the shelf in any of the scheduling state, the positioning task receiving state, and the picking state.

12. The electronic device according to claim 8, wherein the processor is further configured to:

determine a picking priority of the shelf;

obtain position information of the sorting workstation comprised in the positioning task; and transport, based on the picking priority, the shelf that meets the scheduling condition from the storage region to the sorting workstation in the picking region consistent with the position information using the AGV.

13. The electronic device according to claim 8, wherein the processor is further configured to:

determine the time by starting timing after the positioning task is received, or determine the time based on a timestamp carried by the positioning task.

14. A non-transitory computer-readable storage medium having a program stored thereon, wherein when the program is executed by a processor, the processor is configured to:

detect a quantity of an item on a shelf in a storage region, wherein the item is associated with a positioning task having been received;

determine a time of receiving the positioning task;

determine, based on the quantity of the item and the time of receiving the positioning task, whether the shelf meets a scheduling condition, comprising:

determining whether the quantity of the item is greater than or equal to a preset quantity;

determining that the shelf meets the scheduling condition if the quantity of the item is greater than or equal to the preset quantity;

determining whether the time is greater than or equal to a preset duration if the quantity of the item is less than the preset quantity; and determining that the shelf meets the scheduling condition if the time is greater than or equal to the preset duration; and transport, using an automated guided vehicle (AGV), the shelf that meets the scheduling condition from the storage region to a sorting workstation in a picking region directed by the positioning task.

* * * * *